United States Patent
Marquardt et al.

(10) Patent No.: US 11,900,198 B2
(45) Date of Patent: Feb. 13, 2024

(54) MULTI-TIER IDENTITIES IN AN RFID CHIP

(71) Applicant: T-MOBILE INNOVATIONS LLC, Overland Park, KS (US)

(72) Inventors: Ronald R. Marquardt, Woodinville, WA (US); Lyle W. Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 480 days.

(21) Appl. No.: 17/115,596

(22) Filed: Dec. 8, 2020

(65) Prior Publication Data
US 2022/0180141 A1    Jun. 9, 2022

(51) Int. Cl.
*G06K 19/07* (2006.01)
*G06K 19/077* (2006.01)
*H04L 9/08* (2006.01)
*H04L 9/32* (2006.01)
*H04L 9/00* (2022.01)

(52) U.S. Cl.
CPC ..... *G06K 19/0724* (2013.01); *G06K 19/0708* (2013.01); *G06K 19/07762* (2013.01); *H04L 9/0844* (2013.01); *H04L 9/0869* (2013.01); *H04L 9/3242* (2013.01); *H04L 9/50* (2022.05)

(58) Field of Classification Search
CPC ........... G06K 19/0724; G06K 19/0708; G06K 19/07762; H04L 9/0844; H04L 9/0869; H04L 9/3242; H04L 9/50
See application file for complete search history.

(56) References Cited

U.S. PATENT DOCUMENTS 6,882,128 B1   4/2005   Rahmel et al.
7,986,935 B1*  7/2011   D'Souza ........... H04M 15/8044
                                                    455/406

(Continued)

FOREIGN PATENT DOCUMENTS

EP    4172863 A1    5/2023
WO    2008051598 A2   5/2008

(Continued)

OTHER PUBLICATIONS

Marquardt, Ronald, R., et al., "Ambient Electromagnetic Power Harvesting Chip Adaptation Based on Available Power Level," filed Jan. 7, 2022, U.S. Appl. No. 17/571,294.

(Continued)

*Primary Examiner* — Thomas D Alunkal

(57) ABSTRACT

A method of transmitting a first tier of information by a radio frequency identity (RFID) chip when hailed in a first frequency band and transmitting a second tier of information by the RFID chip when hailed in a second frequency band. The method comprises receiving a first hailing radio signal in a first frequency band by an application executing on a processor of an RFID chip, in response to receiving the first radio signal, transmitting a first tier of information stored in the RFID chip in the first frequency band by the application, receiving a second hailing radio signal in a second frequency band by the application, and, in response to receiving the second radio signal, transmitting a second tier of information stored in the RFID chip in the second frequency band by the application.

20 Claims, 5 Drawing Sheets

(56) References Cited

U.S. PATENT DOCUMENTS

| | | | | |
|---|---|---|---|---|
| 8,204,794 | B1* | 6/2012 | Peng | G06Q 10/08 |
| | | | | 705/26.1 |
| 8,593,256 | B2 | 11/2013 | Isabell | |
| 9,411,992 | B1 | 8/2016 | Marek et al. | |
| 9,894,471 | B1 | 2/2018 | Zalewski et al. | |
| 10,938,449 | B1* | 3/2021 | Loman | G06K 19/0702 |
| 11,238,324 | B1 | 2/2022 | Marquardt et al. | |
| 11,258,302 | B1 | 2/2022 | Marquardt et al. | |
| 11,704,528 | B2* | 7/2023 | Marquardt | G06K 19/0709 |
| | | | | 340/572.1 |
| 11,714,985 | B1 | 8/2023 | Bales et al. | |
| 11,757,305 | B2 | 9/2023 | Marquardt et al. | |
| 2006/0071925 | A1* | 4/2006 | Wykoff | G09G 3/3629 |
| | | | | 345/211 |
| 2007/0198631 | A1 | 8/2007 | Uhlmann | |
| 2007/0205902 | A1 | 9/2007 | Cote et al. | |
| 2008/0018467 | A1 | 1/2008 | Estevez et al. | |
| 2008/0129457 | A1 | 6/2008 | Ritter et al. | |
| 2010/0102123 | A1* | 4/2010 | Skowronek | G06Q 20/352 |
| | | | | 235/380 |
| 2012/0018505 | A1* | 1/2012 | Jiang | H01Q 7/00 |
| | | | | 235/375 |
| 2013/0084796 | A1* | 4/2013 | Kerr | G06F 1/1654 |
| | | | | 455/39 |
| 2013/0246212 | A1 | 9/2013 | Sullivan | |
| 2014/0024348 | A1 | 1/2014 | Hurst et al. | |
| 2014/0134468 | A1 | 5/2014 | Schaefer et al. | |
| 2015/0025919 | A1 | 1/2015 | West | |
| 2015/0048682 | A1 | 2/2015 | Murley | |
| 2015/0069126 | A1 | 3/2015 | Leon | |
| 2015/0235270 | A1 | 8/2015 | Partida | |
| 2019/0034672 | A1 | 1/2019 | Rokhsaz | |
| 2019/0138870 | A1 | 5/2019 | Kuzbari et al. | |
| 2019/0354824 | A1 | 11/2019 | Mohiuddin et al. | |
| 2020/0004999 | A1 | 1/2020 | Kawaguchi et al. | |
| 2020/0227813 | A1 | 7/2020 | Yehezkely | |
| 2020/0265446 | A1 | 8/2020 | Vargas | |
| 2021/0019482 | A1 | 1/2021 | Shakedd et al. | |
| 2021/0224727 | A1 | 7/2021 | Rakhunde et al. | |
| 2021/0342559 | A1 | 11/2021 | Frederick | |
| 2022/0121894 | A1 | 4/2022 | Marquardt et al. | |
| 2022/0344971 | A1 | 10/2022 | Marquardt et al. | |
| 2023/0306224 | A1 | 9/2023 | Marquardt et al. | |

FOREIGN PATENT DOCUMENTS

| | | | |
|---|---|---|---|
| WO | 2008055212 | A2 | 5/2008 |
| WO | 2015187199 | A1 | 12/2015 |
| WO | 2018063449 | A1 | 4/2018 |
| WO | 2018132120 | A1 | 7/2018 |
| WO | 20200208412 | A1 | 10/2020 |
| WO | 2022060457 | A1 | 3/2022 |
| WO | 2022125162 | A1 | 6/2022 |
| WO | 2022231682 | A1 | 11/2022 |

OTHER PUBLICATIONS

Marquardt, Ronald, R., et al., "Ambient Electromagnetic Power Harvesting Chip Adaptation Based on Available Power Level," filed Feb. 22, 2022, International Application No. PCT/US2022/017304.

Office Action dated Nov. 12, 2020, U.S. Appl. No. 16/431,550, filed Jun. 4, 2019.

Notice of Allowance dated Feb. 25, 2021, U.S. Appl. No. 16/431,550, filed Jun. 4, 2019.

ICT Monitor Worldwide, "Third-Party Retailers and Carriers Offering iPhone X Pre-Orders Tonight", https://dialog.proquest.com/professional/docview/1956164134?accountid=13144, last accessed Oct. 27, 2017.

Coleman, Lisa, et al., "Prioritized Ordering System and Method," filed Jun. 4, 2019, U.S. Appl. No. 16/431,550.

Katzer, Robin D., et al., "Database Architecture for Reducing the Burden on an On-Disk Database," filed Apr. 6, 2020, U.S. Appl. No. 16/841,388.

Notice of Allowance dated Mar. 7, 2023, U.S. Appl. No. 17/568,019, filed Jan. 4, 2022.

Notice of Allowance dated May 3, 2023, U.S. Appl. No. 17/867,218, filed Jul. 18, 2022.

Bales, Mark, R., et al., "System and Method of Controlling Lifecycles of Ambient Electromagnetic Power Harvesting Chips," filed Feb. 7, 2023, Application No. System and Method of Controlling Lifecycles of Ambient Electromagnetic Power Harvesting Chips.

Foreign Communication From a Related Counterpart Application, International Search Report and Written Opinion dated Nov. 23, 2021, International Application No. PCT/US2021/044086 filed on Jul. 31, 2021.

Foreign Communication From a Related Counterpart Application, International Search Report and Written Opinion dated Dec. 6, 2021, International Application No. PCT/US2021/051159 filed on Sep. 20, 2021.

Notice of Allowance dated Oct. 5, 2021, U.S. Appl. No. 17/024,484, filed Sep. 17, 2020.

Notice of Allowance dated Oct. 21, 2021, U.S. Appl. No. 17/240,846, filed Apr. 26, 2021.

Marquardt, Ronald, R., et al., "RFID Device with Two-Stage Power Harvesting," filed Jul. 31, 2021, International Application No. PCT/US2021/044086.

Marquardt, Ronald, R., et al., "Multi-tier Identities in an RFID Chip," filed Sep. 20, 2021, International Application No. PCT/US2021/051159.

Foreign Communication From a Related Counterpart Application, Invitiation to Pay Additional Fees dated May 30, 2022, International Application No. PCT/US2022/017304.

Marquardt, Ronald, R., et al., "RFID Device with Two-Stage Power Harvesting," filed Jan. 4, 2022, U.S. Appl. No. 17/568,019.

Marquardt, Ronald, R., et al., "Ambient Electromagnetic Power Harvesting Chip Adaptation Based on Available Power Level," filed Apr. 26, 2021, Application No. 171240,846.

Office Action dated Apr. 30, 2020, U.S. Appl. No. 16/158,299, filed Oct. 12, 2018.

Notice of Allowance dated Oct. 30, 2020, U.S. Appl. No. 16/158,299, filed Oct. 12, 2018.

Loman, Clinton H., et al., "Battery Coupled Radio Frequency Identity (RFID)," filed Jan. 28, 2021, U.S. Appl. No. 17/161,415.

Marquardt, Ronald, R., et al., "RFID Device with Two-Stage Power Harvesting," filed Sep. 17, 2020, U.S. Appl. No. 17/024,484.

Foreign Communication From a Related Counterpart Application, International Search Report and Written Opinion dated May 30, 2022, International Application No. PCT/US2022/017304.

Bales, Mark, R., et al., "System and Method of Controlling Unique Identities of Ambient Electromagnetic Power Harvesting Chips," filed Jul. 18, 2022, U.S. Appl. No. 17/867,218.

Office Action dated May 11, 2023, U.S. Appl. No. 17/161,415, filed Jan. 28, 2021.

Notice of Allowance dated May 11, 2023, U.S. Appl. No. 17/571,294, filed Jan. 7, 2022.

Foreign Communication From a Related Counterpart Application, International Search Report and Written Opinion dated May 3, 2023, International Application No. PCT/US2023/014517.

Bales, Mark, R., et al., "System and Method of Controlling Unique Identities of Ambient Electromagnetic Power Harvesting Chips," filed Jun. 1, 2023, International Application No. PCT/US2023/067789.

Bales, Mark, R., et al., "System and Method of Controlling Unique Identities of Ambient Electromagnetic Power Harvesting Chips," filed Jun. 9, 2023, U.S. Appl. No. 18/332,284.

Balmakhtar, Marouane, et al., "Differentiated and Modulated Spectrum Power Radiation Via MIMO and Beamforming Imposed Upon Ambient Electromagnetic Power Harvesting Chips," filed Apr. 3, 2023, U.S. Appl. No. 18/295,075.

Chen, Zhisheng, "Anti-counterfeiting System for Bottled Products," filed May 2, 2022, U.S. Appl. No. 17/734,555.

Chen, Zhisheng, "Anti-counterfeiting System for Bottled Products," filed Mar. 3, 2023, International Application No. PCT/US2023/014517.

(56) References Cited

OTHER PUBLICATIONS

Balmakhtar, Marouane, et al., "Device and Method for Controlling a Physical Indicator of an Ambient Electromagnetic Power Harvesting Device," filed Apr. 10, 2023, U.S. Appl. No. 18/298,253.
Office Action dated Sep. 14, 2023, U.S. Appl. No. 17/161,415, filed Jan. 28, 2021.
Foreign Communication From a Related Counterpart Application, International Search Report and Written Opinion dated Sep. 26, 2023, International Application No. PCT/US2023/067789.

* cited by examiner

MULTI-TIER IDENTITIES IN AN RFID CHIP

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio frequency identity (RFID) chips conventionally are small inexpensive semiconductor devices that have no on-board power. When irradiated with an appropriate electromagnetic signal, the RFID chip draws power from the energy in the electromagnetic signal and wirelessly transmits an identity via a radio frequency. RFID chips may be coupled to or sewn into clothing. RFID chips may be embedded in or adhered to products. Special scanning or reading devices may be used to stimulate the RFID chips with an electromagnetic signal, read the identity broadcast by the RFID chips, and provide this identity back to a computer that the scanning or reading device is communicatively coupled to. Conventional RFID chips may be used in inventory control systems and in other applications.

SUMMARY

In an embodiment, a radio frequency identity (RFID) chip is disclosed. The RFID chip comprises a processor, a radio transceiver communicatively coupled to the processor, a non-transitory memory that stores a generic identity shared with a plurality of other RFID chips and a unique identity that is not shared with other RFID chips, and an application stored in the non-transitory memory. When executed by the processor, the application receives a first query for identity from the radio transceiver received on a first frequency band by the radio transceiver and, in response to the first query for identity, reads the generic identity from the non-transitory memory and causes the radio transceiver to transmit the generic identity on the first frequency band. The application further detects via the radio transceiver radio signals in the first frequency band and stores information about the radio transceiver radio signals in the first frequency band in the non-transitory memory. The application further receives a second query for identity from the radio transceiver received on a second frequency band by the radio transceiver, where the second frequency band is different from the first frequency band and, in response to the second query for identity, reads the unique identity from the non-transitory memory and causes the radio transceiver to transmit the unique identity on the second frequency band. The application further receives a request to upload stored information from the radio transceiver received on the second frequency band, wherein the request to upload provides the unique identity, in response to the request to upload stored information, reads the information about the radio transceiver radio signals in the first frequency band from the non-transitory memory and causes the radio transceiver to transmit the information stored about the radio transceiver radio signals in the first frequency band read from the non-transitory memory on the second frequency band, and after transmitting the information stored about the radio transceiver radio signals, deletes the information about the radio transceiver radio signals in the first frequency band from the non-transitory memory.

In another embodiment, a radio frequency identity (RFID) chip is disclosed. The RFID chip comprises a processor, a radio transceiver communicatively coupled to the processor, a non-transitory memory that stores a generic identity shared with a plurality of other RFID chips and a unique identity that is not shared with other RFID chips, and an application stored in the non-transitory memory. When executed by the processor, the application receives a first query for identity from the radio transceiver received on a first frequency band by the radio transceiver, and in response to the first query for identity, reads the generic identity from the non-transitory memory and causes the radio transceiver to transmit the generic identity on the first frequency band. The RFID chip further receives a second query for identity from the radio transceiver received on a second frequency band by the radio transceiver, where the second frequency band is different from the first frequency band and, in response to the second query for identity, reads the unique identity from the non-transitory memory and causes the radio transceiver to transmit the unique identity on the second frequency band.

In yet another embodiment, a method of logging information detected in a first frequency band by a radio frequency identity (RFID) chip and transmitting the logged information in a second frequency band by the RFID chip when requested by a reader via the second frequency band is disclosed. The method comprises receiving information by an application executing on a processor of a radio frequency identity (RFID) chip from a radio transceiver of the RFID chip, where the radio transceiver receives the information in a first frequency band and storing the information by the application in a non-transitory memory of the RFID chip. The method further comprises receiving an authentication message by the radio transceiver in a second frequency band from a reader, authenticating the authentication message by the application, reading the information stored in the non-transitory memory by the application, and transmitting the information read from the non-transitory memory by the application via the radio transceiver in the second frequency band to the reader.

In yet another embodiment, a method of transmitting a first tier of information by a radio frequency identity (RFID) chip when hailed in a first frequency band and transmitting a second tier of information by the RFID chip when hailed in a second frequency band is disclosed. The method comprises receiving a first radio signal in a first frequency band by an application executing on a processor of a radio frequency identity (RFID) chip, where the first radio signal hails the RFID chip to transmit information and, in response to receiving the first radio signal, transmitting a first tier of information stored in the RFID chip in the first frequency band by the application. The method further comprises receiving a second radio signal in a second frequency band by the application, where the second radio signal hails the RFID chip to transmit information and, in response to receiving the second radio signal, transmitting a second tier of information stored in the RFID chip in the second frequency band by the application, wherein the second tier of information contains different information than the first tier of information contains.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
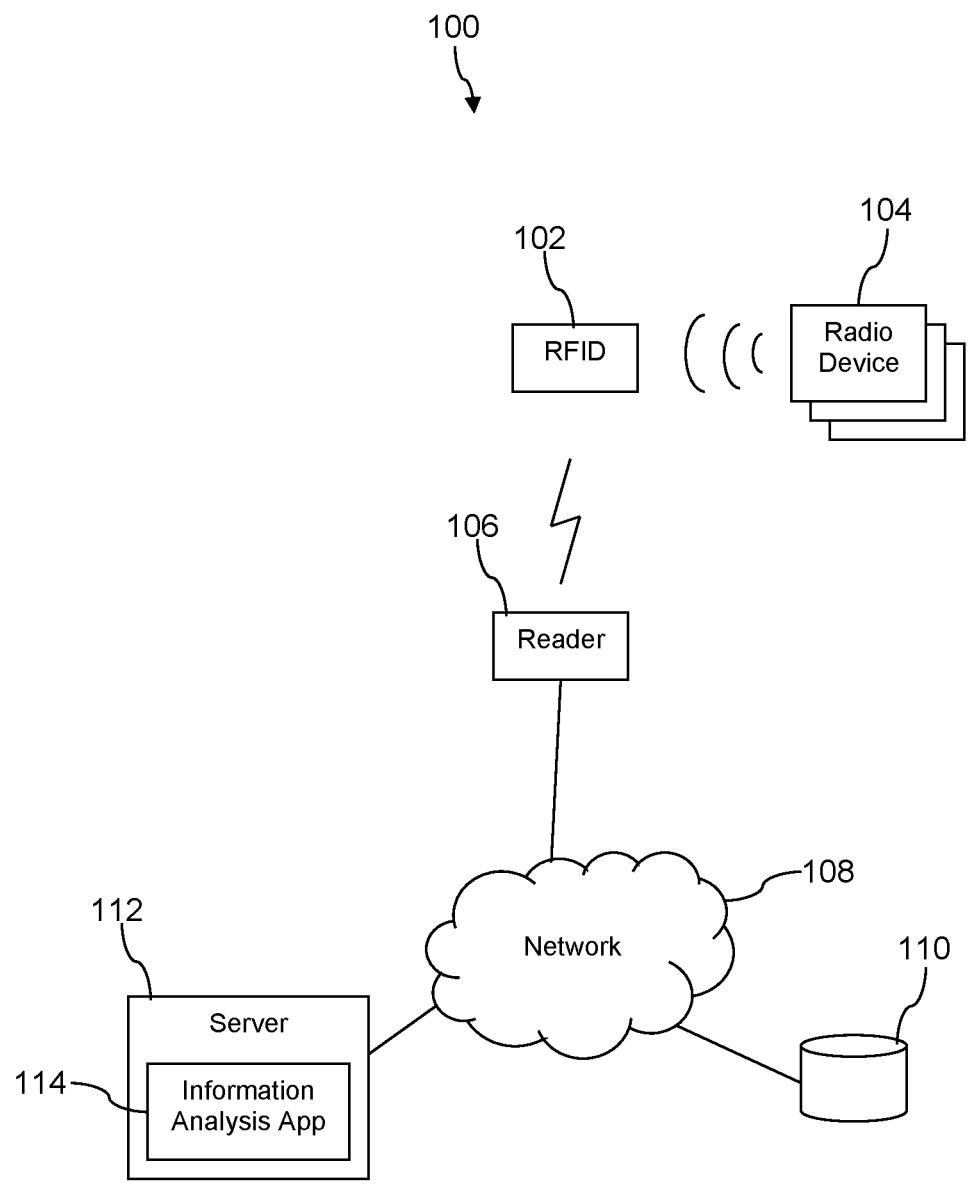
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a new radio frequency identity (RFID) chip that provides selective multi-tier functionality responsive to what frequency band it is hailed on by a scanner or a reader device. The selective multi-tier functionality RFID chip taught herein is a particular solution to a technical problem. Conventional RFID chips or RFID tags are single function devices and reveal their identity in an unrestricted way. This can present a security problem in sensitive environments, for example in a medical care facility such as a hospital. By contrast the RFID chip disclosed herein shares a generic identity when hailed in a first frequency band and shares a unique and possibly confidential identity when hailed in a second frequency band. The generic identity and the unique identity returned by the RFID chip may be referred to as multi-tier information or multi-tier identities.

In an embodiment, the RFID chip shares its unique identity only after completing a process of authenticating the scanner or reader device that is querying its unique identity, thereby providing yet more security. The scanner or reader device may provide an authentication key, and the RFID chip may compare the received authentication key with a stored authentication key. If the two keys match, the scanner or reader device is deemed to have successfully authenticated itself, otherwise the scanner or reader device fails authentication.

In an embodiment, a two step process of authentication may be conducted. In this embodiment, the RFID chip may provide a seed or a nonce value along with its generic identity when hailed in the first frequency band by the scanner or reader device. When the scanner or reader device hails the RFID chip in the second frequency band, it provides a hashed value of the seed or nonce value received along with the generic identity in the first frequency band. The RFID chip hashes the seed or nonce value according to the same hashing method and compares its own generated hash value to the hash value provided by the scanner or reader device. If the two hash values are identical, the RFID chip engages the scanner or reader device to complete the second stage of authentication by providing the authentication key described above. The two step process of authentication can provide the benefit of increased security and reduces the risk of replay authentication spoofing.

Another form of multi-tier functionality selected based on frequency band involves the RFID chip capturing information about radio signals in a first frequency band, storing that information with a time and date stamp, and then uploading that captured information to a scanner or a reader device that queries in a second different frequency band, perhaps after completing an authentication process. This selective multi-tier functionality can be used in a medical care facility to track and monitor use of personal protective equipment, diagnostic samples, patients receiving medical care. This selective multi-tier functionality can be used in contact tracing.

In an embodiment, the RFID chip taught herein receives power from an energizing electromagnetic signal. The RFID chip may receive power in the second frequency band, for example in a frequency band in the range of 47 GHz to 60 GHz. Some of these frequency bands in this range may be unregulated, and hence the scanner or reader device may emit a relatively high power in this frequency band that is able to power the RFID chip from a greater distance than conventional RFID scanners or reader devices. Additionally, the greater power in the second frequency band can support the RFID chip transmitting more detailed information to the scanner or reader device and/or transmitting the information at a higher bit rate.

The RFID chip may also receive power in the 1.9 GHz cellular radio band and/or from the conventional RFID frequency band 946 MHz to 948 MHz. The RFID chip may respond to queries in the 946 MHz to 948 MHz band or in the 1.9 GHz cellular radio bands by providing its generic identity—such as "I am a blood sample," "I am a urine sample," "I am a nurse's badge," "I am a disposable face mask" without providing a unique identity. By contrast, if queried (possibly after completing an authentication process) by a scanner or reader device in the second frequency band by providing its unique identity such as "I am Dale G. Parker's blood sample #3," "I am Mary Z. Green's urine sample #7," "I am nurse Smith's badge," or "I am disposable face mask 37201."

Additionally, the RFID chip may upload information it has collected from its radio environment to the scanner or reader device that queries it (possibly after completing an authentication process) in the second frequency band. This information may be a list of beacon radio signals detected by the RFID chip along with a time stamp. This information may be a list of identities of other RFID chips that have responded to queries and have been overheard by the selective multi-tier functionality RFID chip and a time stamp when overheard. After uploading this information to the scanner or reader device, the RFID chip may delete this information from its memory, whereby to avoid overrunning limited memory. In an embodiment, the roles or functionality tiers associated with the first frequency band may be associated to a different third frequency band, and the roles associated with the second frequency band may be associated to a fourth frequency band. Said in other words, the frequency band associated with the first role or tier of functionality may be reconfigured over time, and the frequency band associated with the second role or tier of functionality may be reconfigured over time.

Turning now to FIG. 1, a system 100 is described. In an embodiment, the system 100 comprises a multi-tier functionality RFID chip 102, one or more radio devices 104, a reader device 106, a network 108, and a data store 110. The multi-tier functionality RFID chip 102 detects and/or receives radio and/or electromagnetic signals emitted by radio devices 104 in a first radio frequency band and stores information about what it detects in a memory. In an embodiment, the radio devices 104 may emit electromagnetic signals in the 946 MHz to 948 MHz frequency band. In an embodiment, the radio devices 104 may emit electromagnetic signals in a different frequency band less than 4 GHz.

When queried by the reader 106 in a second radio frequency band, the multi-tier functionality RFID chip 102 may wirelessly transmit the information it stored via the second radio frequency band to the reader 106. In an embodiment, the reader 106 communicates with the RFID 102 in a frequency band in the range 47 GHz to 60 GHz. In an embodiment, the reader 106 communicates with the RFID 102 in a frequency band in a range from greater than 4 GHz and less than 100 GHz. Before responding to the query from the reader 106, the multi-tier functionality RFID chip 102 may challenge the reader 106 to authenticate itself by completing an authentication handshake process with the multi-tier functionality RFID chip 102. The authentication handshake process may involve the reader 106 transmitting a secret such as an access token or an access key to the multi-tier functionality RFID chip 102. The multi-tier functionality RFID chip 102 may compare the received secret to a stored copy of the secret to authenticate the reader 106. In the interest of concision, the multi-tier functionality RFID chip 102 is referred to hereinafter as the RFID 102, except when confusion may result, in which case the fuller expression is employed.

The network comprises one or more public networks, one or more private networks, or a combination thereof. The radio devices 104 may comprise radio beacons, conventional RFID chips, and/or conventional RFID scanners or RFID reader devices. The information that the RFID 102 transmits to the reader 106 may comprise identities of radio devices 104 (e.g., identities of beacons, identities of other RFID devices, identities of readers). In an embodiment, the RFID 102 has no internal power source and harvests power from ambient electromagnetic waves and/or radio waves. In an embodiment, the RFID 102 harvests power from ambient cellular radio communication radio waves. For further details on an RFID device that harvests power from ambient cellular radio communication radio waves see U.S. patent application Ser. No. 17/024,484, filed Sep. 17, 2020, titled "RFID Device with Two-Stage Power Harvesting," by Ronald R. Marquardt, et al., which is incorporated herein by reference in its entirety. In an embodiment, the RFID 102 harvests power from ambient electromagnetic waves emitted in a 850 MHz frequency band, a 1900 MHz frequency band, a 2800 MHz frequency band, or a 3900 MHz frequency band. In an embodiment, the RFID 102 additionally harvests power from electromagnetic energy emitted by the reader 106. In an embodiment, the RFID 102 harvests power emitted by the reader 106 in a frequency band in the range 47 GHz to 60 GHz. One or more frequency bands in the 47 GHz to 60 GHz frequency range may not be regulated by the FCC, and hence emitting relatively high power signals in this frequency band may not violate anti-interference regulations and/or requirements. In another embodiment, however, the RFID 102 comprises an electric battery and receives power from the electric battery.

The higher power emitted by the reader 106 in the range 47 GHz to 60 GHz may promote the reader 106 communicating with the RFID 102 at a greater distance, for example at a distance up to 5 feet, a distance up to 10 feet, a distance up to 15 feet, a distance up to 20 feet, a distance up to 25 feet, a distance up to 30 feet, a distance up to 35 feet, a distance up to 40 feet, a distance up to 45 feet, a distance up to 50 feet, or a distance up to 100 feet. It is understood that conventional RFID chips are restricted to communicating over a relatively short distance, for example over a distance of less than 5 feet or over a distance of less than 2 feet.

In an embodiment, when the RFID 102 is requested to share its identity with a radio device 104 communicating in the first frequency band, the RFID 102 reads a generic identity from its memory and transmits this generic identity on the first frequency band to the requesting radio device 104. In an embodiment, the first frequency band may be a 946 MHz to 948 MHz frequency band. This generic identity may identify a role played by the RFID 102 or a role played by an artifact with which the RFID 102 is associated, for example an article the RFID 102 is sewn into or is adhered to. In a medical care environment, such a generic identity may be, for example, "patient wristband," "nurse badge," "doctor badge," "blood sample," "urine sample," or "facemask."

When the RFID 102 is requested to share its identity with the reader 106 communicating in the second frequency band, the RFID 102 reads a unique identity from its memory and transmits this unique identity on the second frequency band to the reader 106. In an embodiment, the second frequency band may be a frequency band in the frequency range 47 GHz to 60 GHz. The unique identity may be a unique identity that distinguishes between a first instance of an RFID 102 having a first generic identity and a second instance of an RFID 102 having the same first generic identity. For example, the unique identity of a first RFID 102 having a generic identity of "patient wristband" may be "Robert Z. Brown" and the unique identity of a second RFID 102 having the generic identity of "patient wristband" may be "Rudolph B. Klimpschberger." The unique identity may be a unique number rather than a text string. In an embodiment, the unique identity may be mapped by the data store 110 to further details such as a name, a history of interactions of the RFID 102 with radio devices 104 and/or the reader 106. In an embodiment, the unique identity is not globally unique (e.g., unique and different from all other identities on the Earth) but unique within a particular domain. In an embodiment, the unique identity distinguishes one patient wristband from other patient wristbands within a domain (e.g., within the same hospital or system of hospitals), distinguishes one nurse badge from other nurse badges within the domain, distinguishes one doctor badge from other doctor badges within the domain, distinguishes one blood sample from other blood samples within the domain, or distinguishes one urine sample from other urine samples within the domain.

The reader 106 is communicatively coupled to the network 108 and transmits the information received from the RFID 102 via the network 108 to the data store 110. The reader 106 may be communicatively coupled to the network 108 by a wired link or by a wireless link, for example via a cell site. The system further comprises a server 112 that executes an information analysis application 114 that accesses the information stored in the data store 110 by the reader 106 and analyzes that information. The information analysis application 114 can support a plurality of different use cases. The server 112 may be implemented as a computer system. Computer systems are described further hereinafter.

In a first use case, the RFID 102 can be associated with a patient wristband in a hospital. When the RFID 102 detects a radio signal emitted by a radio device 104 associated with a nurse, for example a multi-tier functionality RFID chip like RFID 102, a conventional RFID chip, or another radio device 104 coupled to a nurse's badge, the RFID 102 records information about the detected radio signal. For example, the RFID 102 records a generic identity broadcast by the radio device 104 and/or a unique identity broadcast by the radio device 104. In an embodiment, the RFID 102 records the information along with date-time of the detection.

In an embodiment, the reader 106 may be located at an exit of a hospital. In an embodiment, the reader 106 may be located at an entrance of a department of a hospital such as an entrance to a recovery room, an entrance to intensive care, an entrance to surgery, an entrance to an X-ray imaging room, an entrance to a CAT scan imaging room, or another department of a hospital. The reader 106 may add a record of its own identity and a date-time to the records or information received from the RFID 102 when storing the information in the data store 110.

This information, after storing in the data store 110, may be analyzed by the information analysis application 114 to infer that the patient bearing the wristband associated with the RFID 102 was visited by a nurse and/or by a particular nurse at the indicated date-time. Likewise, when the RFID 102 detects a radio signal emitted by a radio device 104 associated with a doctor, the RFID 102 records information about that detected radio signal and a date-time of the detection. This information, conveyed to the reader 106 and stored in the data store 110, may be analyzed by the information analysis application 114 to infer that the patient bearing the wristband associated with the RFID 102 was visited by a doctor and/or by a particular doctor at the indicated date-time. When the RFID 102 detects a radio signal emitted by a radio device 104 that is a beacon located at the entrance of the recovery room of the hospital, the RFID 102 records information about that detected radio signal and a date-time of the detection.

This information, conveyed to the reader 106 and stored in the data store 110, may be analyzed by the information analysis application 114 to infer that the patient bearing the wristband associated with the RFID 102 was rolled into the recovery room (for example, after knee replacement surgery) at the indicated date-time. This analysis can be used to generate a history of the patient within the medical care facility during a period of admittance, and the history of the patient stored in the data store 110. It is understood that this simple example can be extended with a variety of other distinct interactions, for example interactions with diagnostic equipment, food service, etc.

In a second use case, the RFID 102 can be associated with a DNA sample or a diagnostic sample, for example a blood sample, a urine sample, a biopsy sample, or other sample. The RFID 102 can maintain a history or log of radio signals it has detected emitted by radio devices 104 and upload this to the reader 106 when appropriately requested. In a manner like that described above with reference to a medical care environment, the RFID 102 can provide a bread crumb trail that can be analyzed to track a chain of custody of the sample. For example, this history can identify a person who collected the sample, a person who transported the sample, a location where the sample was stored, a location where the sample was analyzed. This kind of automated detection and tracking of interactions with radio devices 104 can provide a higher level of confidence in the integrity of DNA samples and of diagnostic samples.

Figure 2:
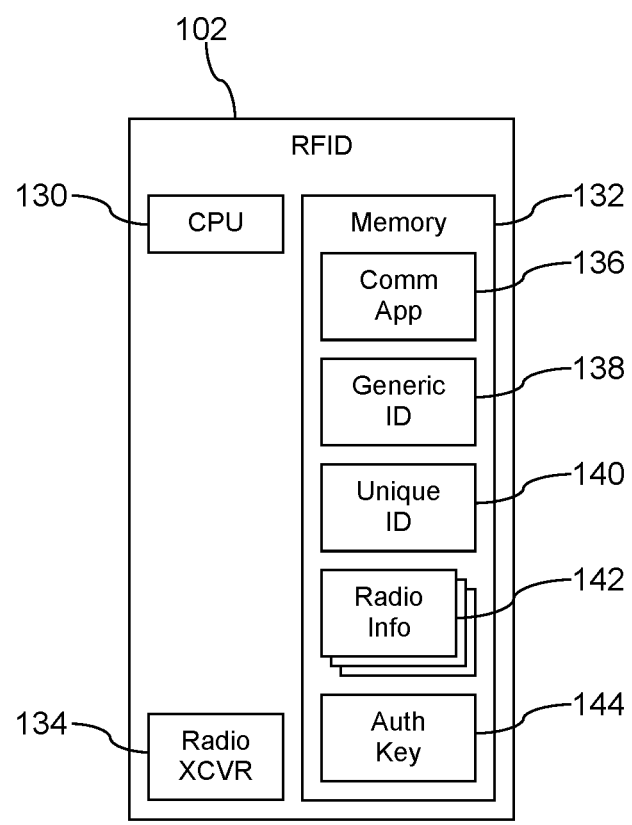
FIG. 2 is a block diagram of a radio frequency identity (RFID) chip according to an embodiment of the disclosure.

Turning now to FIG. 2, further details of the multifunction RFID chip 102 are described. In an embodiment, the RFID 102 comprises a processor 130, a memory 132, and a radio transceiver 134. In an embodiment, the radio transceiver 134 or the RFID 102 comprises two radio transceivers, a first radio transceiver operable to receive and transmit in the first frequency band and a second radio transceiver operable to receive and transmit in the second frequency band. The memory 132 comprises a non-transitory portion that stores a communication application 136, a generic identity 138, and a unique identity 140. As the RFID 102 detects radio devices 104 on the first frequency band as described above with reference to FIG. 1, the communication application 136, executing on the processor 130, creates radio information records 142 about the detection events and stores them in the non-transitory portion of the memory 132. In an embodiment, the non-transitory portion of the memory 132 further comprises an authorization key 144 that may be used to authenticate the reader 106.

The communication application 136 detects when the reader 106 hails it on the second frequency band, and it optionally challenges the reader 106 to authenticate itself by transmitting a secret to the RFID 102, for example a token or an authentication key. If the reader 106 successfully authenticates (or if no authentication process is performed by the communication application 136), the RFID 102 responds to requests from the reader 106. Using the second frequency band, the reader 106 may request the unique identity 140 and/or the generic identity 138 of the RFID 102. The communication application 136 accesses the unique identity 140 and/or the generic identity 138 and transmits this identity or identities via the radio transceiver 134 on the second frequency band to the reader 106. Using the second frequency band, the reader 106 may request the RFID 102 to transmit the radio information records 142 accumulated by the RFID 102. The communication application 136 may access the stored radio information records 142 and transmit the radio information records 142 via the radio transceiver 134 on the second frequency band to the reader 106. After transmitting the radio information records 142, the communication application 136 optionally deletes the radio information records 142 from the non-transitory portion of the memory 132, whereby to conserve limited space in the non-transitory portion of the memory 132 available for such records. In an embodiment, the RFID 102 waits for the reader 106 to acknowledge receipt of the radio information 142 before deleting them from the non-transitory portion of the memory 132.

Figure 3:
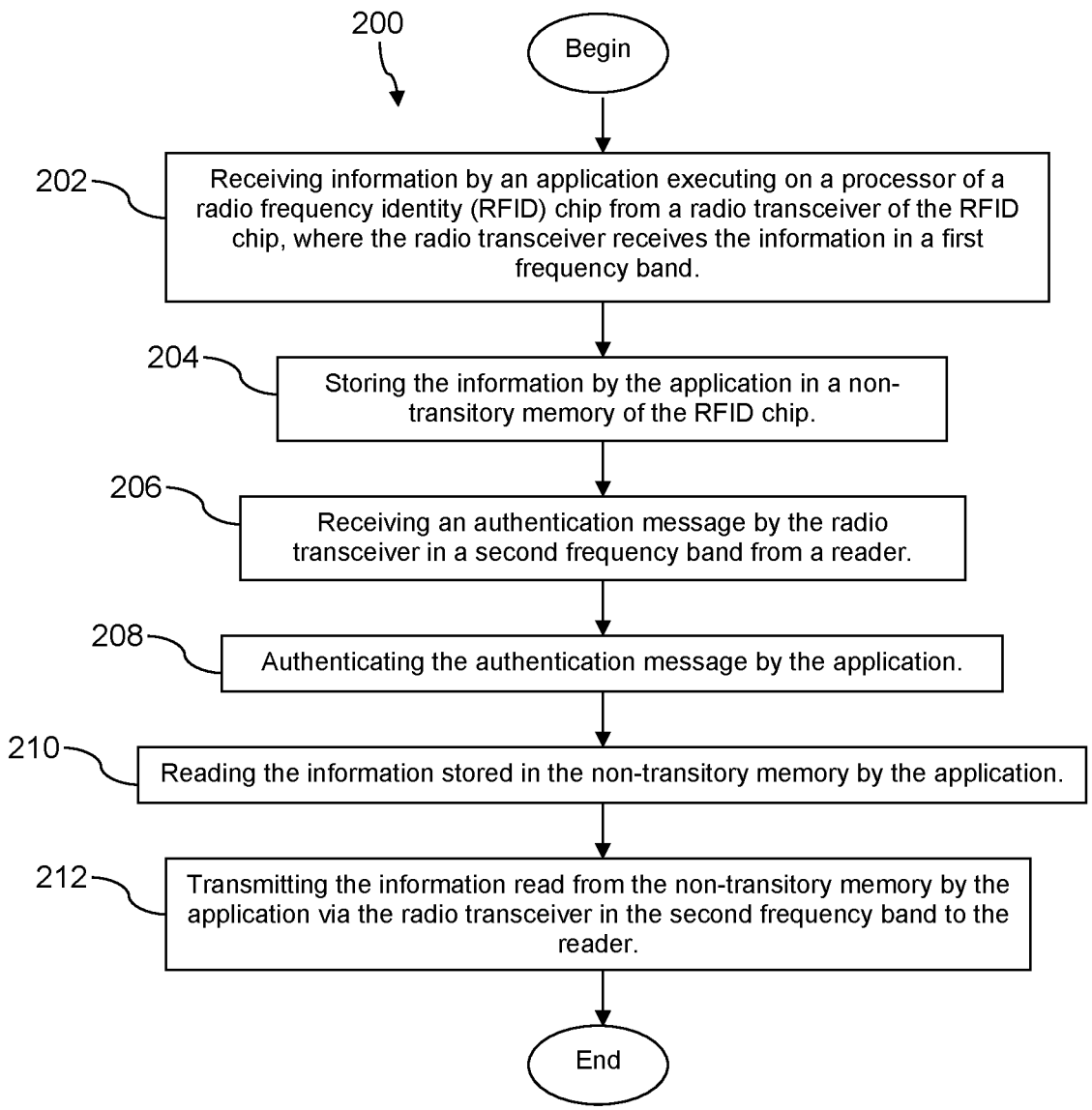
FIG. 3 is a flow chart of a method according to an embodiment of the disclosure.

Turning now to FIG. 3 a method 200 is described. In an embodiment, method 200 is a method of logging information detected in a first frequency band by a radio frequency identity (RFID) chip and transmitting the logged information in a second frequency band by the RFID chip when requested by a reader via the second frequency band. In an embodiment, the RFID chip receives power from ambient electromagnetic waves. At block 202, the method 200 comprises receiving information by an application executing on a processor of a radio frequency identity (RFID) chip from a radio transceiver of the RFID chip, where the radio transceiver receives the information in a first frequency band. In an embodiment, the first frequency band comprises a 946 MHz to 948 MHz frequency band.

At block 204, the method 200 comprises storing the information by the application in a non-transitory memory of the RFID chip. In an embodiment, the information stored by the application comprises identities of beacons detected by the RFID chip and a date-time of detection. In an embodiment, the information stored by the application comprises identities of other RFID chips detected by the RFID chip and a date-time of detection. In an embodiment, wherein the information stored by the application comprises identities of readers that queried the RFID chip on the first frequency band and a date-time of the queries. At block 206, the method 200 comprises receiving an authentication message by the radio transceiver in a second frequency band from a reader or a scanner. In an embodiment, the second frequency band is in the frequency range of 47 GHz to 60 GHz. In an embodiment, the reader is located at an exit of a hospital. In an embodiment, the reader is located at an entrance of a department of a hospital, for example an entrance to a recovery room, an entrance to intensive care, an entrance to surgery, an entrance to an X-ray imaging room, an entrance to a CAT scan imaging room, or another department of a hospital.

At block 208, the method 200 comprises authenticating the authentication message by the application. In an embodiment, authenticating the authentication message by the application comprises comparing an authentication key contained in the authentication message to a corresponding key stored in the RFID chip. At block 210, the method 200 comprises reading the information stored in the non-transitory memory by the application. At block 212, the method 200 comprises transmitting the information read from the non-transitory memory by the application via the radio transceiver in the second frequency band to the reader or scanner.

Figure 4:
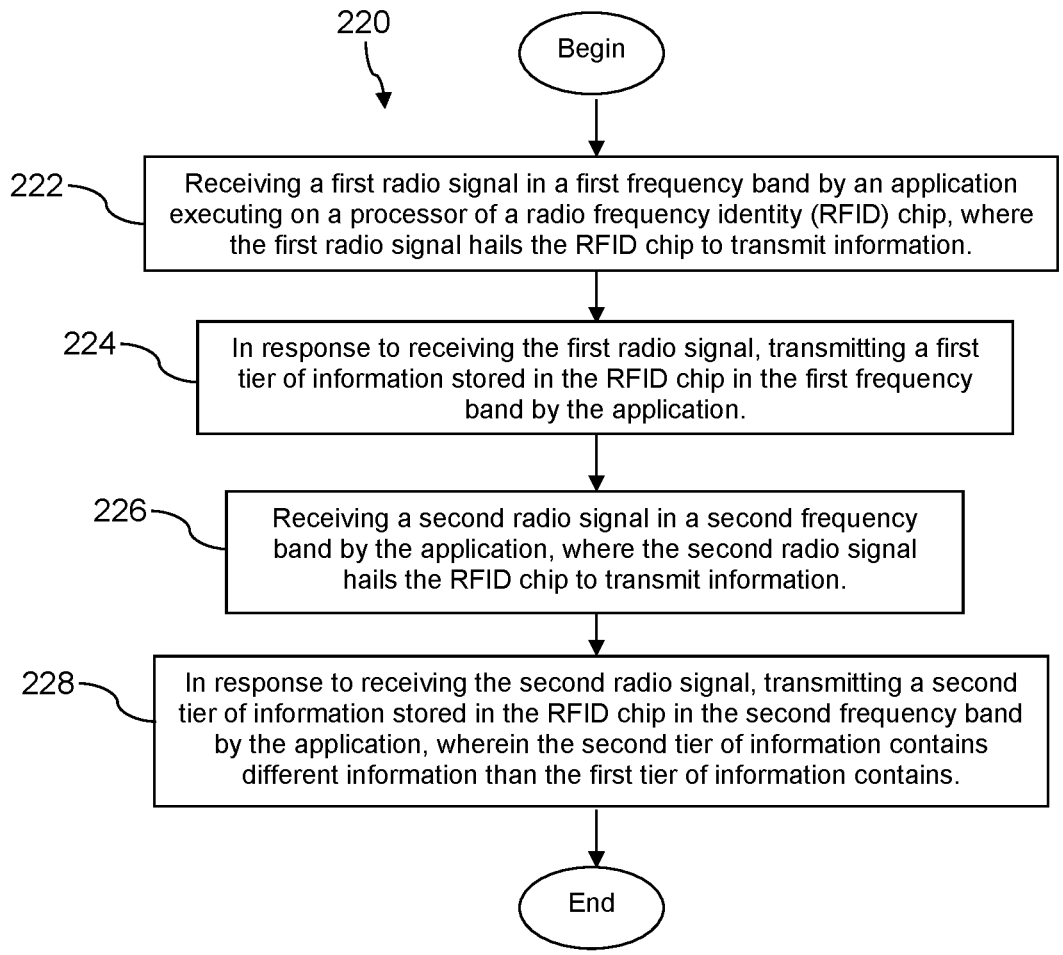
FIG. 4 is a flow chart of another method according to an embodiment of the disclosure.

Turning now to FIG. 4, a method 220 is described. In an embodiment, method 220 is a method of transmitting a first tier of information by a radio frequency identity (RFID) chip when hailed in a first frequency band and transmitting a second tier of information by the RFID chip when hailed in a second frequency band. In an embodiment, the first frequency band comprises a 946 MHz to 948 MHz frequency band. In an embodiment, the second frequency band is in the frequency range of 47 GHz to 60 GHz.

At block 222, the method 220 comprises receiving a first radio signal in a first frequency band by an application executing on a processor of a radio frequency identity (RFID) chip, where the first radio signal hails the RFID chip to transmit information. At block 224, the method 220 comprises, in response to receiving the first radio signal, transmitting a first tier of information stored in the RFID chip in the first frequency band by the application.

At block 226, the method 220 comprises receiving a second radio signal in a second frequency band by the application, where the second radio signal hails the RFID chip to transmit information. At block 228, the method 220 comprises, in response to receiving the second radio signal, transmitting a second tier of information stored in the RFID chip in the second frequency band by the application, wherein the second tier of information contains different information than the first tier of information contains. In an embodiment, the first tier of information comprises a generic identity associated with the RFID chip that is shared with a plurality of other RFID chips. In an embodiment, the second tier of information comprises a unique identity that is not shared with other RFID chips.

In an embodiment, the second radio signal is received from a reader, and the method 220 further comprises authenticating the reader by the application before transmitting the second tier of information. In an embodiment, authenticating the reader comprises comparing an authentication key stored in the RFID chip to an authentication key provided by the reader. In an embodiment, the second radio signal comprises a hash of a seed provided in the first tier of information, and authenticating the reader further comprises validating the hash of the seed provided in the second radio signal by the application.

Figure 5:
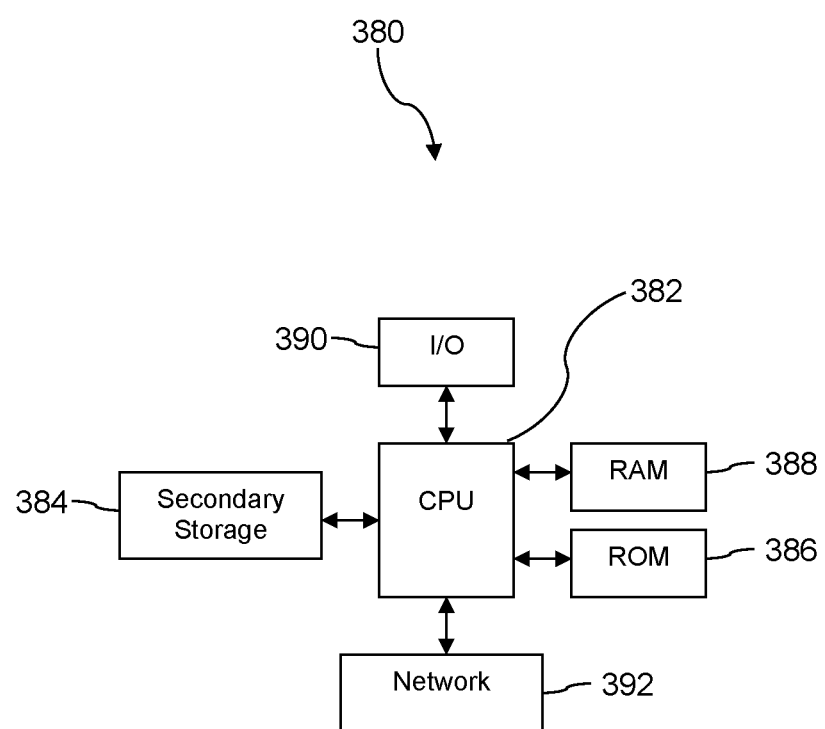
FIG. 5 is a block diagram of a computer according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 are typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A radio frequency identity (RFID) chip, comprising:
   a processor;
   a radio transceiver communicatively coupled to the processor;
   a non-transitory memory that stores a generic identity shared with a plurality of other RFID chips and a unique identity that is not shared with other RFID chips; and
   an application stored in the non-transitory memory that, when executed by the processor:
      receives a first query for identity from the radio transceiver received on a first frequency band by the radio transceiver,
      in response to the first query for identity, reads the generic identity from the non-transitory memory and causes the radio transceiver to transmit the generic identity on the first frequency band,
      detects via the radio transceiver radio signals in the first frequency band,
      stores information about the radio transceiver radio signals in the first frequency band in the non-transitory memory,
      receives a second query for identity from the radio transceiver received on a second frequency band by the radio transceiver, where the second frequency band is different from the first frequency band,
      in response to the second query for identity, reads the unique identity from the non-transitory memory and causes the radio transceiver to transmit the unique identity on the second frequency band,
      receives a request to upload stored information from the radio transceiver received on the second frequency band, wherein the request to upload provides the unique identity,
      in response to the request to upload stored information, reads the information about the radio transceiver radio signals in the first frequency band from the non-transitory memory and causes the radio transceiver to transmit the information stored about the radio transceiver radio signals in the first frequency band read from the non-transitory memory on the second frequency band, and
      after transmitting the information stored about the radio transceiver radio signals, deletes the information about the radio transceiver radio signals in the first frequency band from the non-transitory memory.

2. The RFID chip of claim 1, wherein the generic identity is patient wristband, nurse badge, doctor badge, blood sample, or urine sample.

3. The RFID chip of claim 2, wherein the unique identity distinguishes one patient wristband from other patient wristbands within a domain, distinguishes one nurse badge from other nurse badges within the domain, distinguishes one doctor badge from other doctor badges within the domain, distinguishes one blood sample from other blood samples within the domain, or distinguishes one urine sample from other urine samples within the domain.

4. The RFID chip of claim 1, wherein the RFID chip receives power from ambient electromagnetic waves.

5. The RFID chip of claim 1, wherein the RFID chip comprises an electric battery.

6. The RFID chip of claim 1, wherein the radio transceiver comprises a first radio transceiver associated with the first frequency band and a second radio transceiver associated with the second frequency band.

7. The RFID chip of claim 1, wherein the radio transceiver receives the second query from a reader and the application further, in response to the second query for identity, authenticates the reader before reading the unique identity from the non-transitory memory and causing the radio transceiver to transmit the unique identity on the second frequency band.

8. A radio frequency identity (RFID) chip, comprising:
a processor;
a radio transceiver communicatively coupled to the processor;
a non-transitory memory that stores a generic identity shared with a plurality of other RFID chips and a unique identity that is not shared with other RFID chips; and
an application stored in the non-transitory memory that, when executed by the processor:
receives a first query for identity from the radio transceiver received on a first frequency band by the radio transceiver,
in response to the first query for identity being received on the first frequency band, reads the generic identity from the non-transitory memory and causes the radio transceiver to transmit the generic identity on the first frequency band,
receives a second query for identity from the radio transceiver received on a second frequency band by the radio transceiver, where the second frequency band is different from the first frequency band, and
in response to the second query for identity being received on the second frequency band, reads the unique identity from the non-transitory memory and causes the radio transceiver to transmit the unique identity on the second frequency band.

9. The RFID chip of claim 8, wherein the first frequency band comprises a 946 MHz to 948 MHz frequency band.

10. The RFID chip of claim 8, wherein the second frequency band is in the frequency range of 47 GHz to 60 GHz.

11. The RFID chip of claim 8, wherein the RFID chip receives power from ambient electromagnetic waves.

12. The RFID chip of claim 11, wherein the RFID chip receives power from ambient electromagnetic waves emitted in a cellular radio frequency band.

13. The RFID chip of claim 12, wherein the RFID chip receives power from ambient electromagnetic waves emitted in a 850 MHz frequency band, a 1900 MHz frequency band, a 2800 MHz frequency band, or a 3900 MHz frequency band.

14. A method of transmitting a first tier of information by a radio frequency identity (RFID) chip when hailed in a first frequency band and transmitting a second tier of information by the RFID chip when hailed in a second frequency band, comprising:
receiving a first radio signal in a first frequency band by an application executing on a processor of a radio frequency identity (RFID) chip, where the first radio signal hails the RFID chip to transmit information;
in response to receiving the first radio signal in the first frequency band, transmitting a first tier of information stored in the RFID chip in the first frequency band by the application;
receiving a second radio signal in a second frequency band by the application, where the second radio signal hails the RFID chip to transmit information; and
in response to receiving the second radio signal in the second frequency band, transmitting a second tier of information stored in the RFID chip in the second frequency band by the application, wherein the second tier of information contains different information than the first tier of information contains.

15. The method of claim 14, wherein the first frequency band comprises a 946 MHz to 948 MHz frequency band.

16. The method of claim 14, wherein the wherein the second frequency band is in the frequency range of 47 GHz to 60 GHz.

17. The method of claim 14, wherein the second radio signal is received from a reader, further comprising authenticating the reader by the application before transmitting the second tier of information.

18. The method of claim 17, wherein authenticating the reader comprises comparing an authentication key stored in the RFID chip to an authentication key provided by the reader.

19. The method of claim 18, wherein the second radio signal comprises a hash of a seed provided in the first tier of information and wherein authenticating the reader further comprises validating the hash of the seed provided in the second radio signal by the application.

20. The method of claim 14, wherein the first tier of information comprises a generic identity associated with the RFID chip that is shared with a plurality of other RFID chips and wherein the second tier of information comprises a unique identity that is not shared with other RFID chips.

* * * * *